US012784737B2

(12) United States Patent
Clifton et al.

(10) Patent No.: US 12,784,737 B2
(45) Date of Patent: Nov. 3, 2026

(54) SYSTEMS AND METHODS FOR MEDIA SEGMENTATION

(71) Applicant: Spotify AB, Stockholm (SE)

(72) Inventors: Ann Clifton, New York, NY (US); Adam Feldstein Jacobs, New York, NY (US)

(73) Assignee: Spotify AB, Stockholm (SE)

( * ) Notice: Subject to any disclaimer, the term of this patent is extended or adjusted under 35 U.S.C. 154(b) by 216 days.

(21) Appl. No.: 18/335,007

(22) Filed: Jun. 14, 2023

(65) Prior Publication Data

US 2023/0410793 A1 Dec. 21, 2023

Related U.S. Application Data

(60) Provisional application No. 63/404,437, filed on Sep. 7, 2022, provisional application No. 63/352,565, filed on Jun. 15, 2022.

(51) Int. Cl.
*G10L 15/04* (2013.01)
*H04N 21/8547* (2011.01)

(52) U.S. Cl.
CPC ......... *G10L 15/04* (2013.01); *H04N 21/8547* (2013.01)

(58) Field of Classification Search
CPC ... G10L 2015/088; G10L 15/08; G10L 21/10; G10L 15/1815; G10L 15/063; G10L 15/1822; G10L 15/183; G10L 15/04; G10L 17/04
USPC .......................................................... 704/254
See application file for complete search history.

(56) References Cited

U.S. PATENT DOCUMENTS

| | | | | |
|---|---|---|---|---|
| 8,249,872 | B2 * | 8/2012 | Aronowitz | G10L 17/00 704/251 |
| 9,891,883 | B2 * | 2/2018 | Sharma | G10L 19/0212 |
| 10,459,685 | B2 * | 10/2019 | Sharma | G10L 19/018 |
| 10,945,040 | B1 | 3/2021 | Bedi et al. | |
| 12,087,278 | B2 * | 9/2024 | Zhicharevich | G06F 40/253 |
| 12,204,856 | B1 * | 1/2025 | Somasundaran | G06F 40/284 |
| 2006/0065106 | A1 * | 3/2006 | Pinxteren | G10L 25/48 84/615 |
| 2006/0075347 | A1 * | 4/2006 | Rehm | G10L 15/26 704/E15.045 |
| 2008/0066136 | A1 | 3/2008 | Dorai et al. | |
| 2010/0042412 | A1 * | 2/2010 | Aronowitz | G10L 25/87 704/E11.001 |

(Continued)

OTHER PUBLICATIONS

Lawto, "A Scalable Video Search Engine Based on Audio Content Indexing and Topic Segmentation", NEM Summity, Torino, Italy, Nov. 27, 2011, 6 pgs.

*Primary Examiner* — Richemond Dorvil
(74) *Attorney, Agent, or Firm* — Morgan, Lewis & Bockius LLP

(57) ABSTRACT

The various implementations described herein include methods and devices for media segmentation. In one aspect, a method includes obtaining audio content for a podcast and generating sentence embeddings for the audio content. The method also includes generating segment embeddings using the sentence embeddings and context information, and determining, for each segment embedding, whether the segment embedding includes a topic transition for the podcast. The method further includes generating one or more topic transition timestamps for the podcast in accordance with the determining.

20 Claims, 9 Drawing Sheets

(56) References Cited

U.S. PATENT DOCUMENTS

| | | | | |
|---|---|---|---|---|
| 2020/0074280 | A1* | 3/2020 | Meier | G06T 7/70 |
| 2021/0005195 | A1* | 1/2021 | Tao | G06F 40/216 |
| 2022/0050872 | A1 | 2/2022 | Adlersberg et al. | |
| 2023/0027526 | A1* | 1/2023 | Kim | G06F 40/30 |
| 2023/0353407 | A1* | 11/2023 | Giovanardi | G06F 40/289 |
| 2025/0331764 | A1* | 10/2025 | Izakson | G06F 3/015 |
| 2025/0336409 | A1* | 10/2025 | Hayun | G10L 25/48 |

* cited by examiner

SYSTEMS AND METHODS FOR MEDIA SEGMENTATION

PRIORITY AND RELATED APPLICATIONS

This application claims priority to U.S. Provisional Patent Application No. 63/352,565, entitled "Systems and Methods for Media Segmentation" filed Jun. 15, 2022, and to U.S. Provisional Patent Application No. 63/404,437, entitled "Systems and Methods for Generating and Publishing Media Segments" filed Sep. 7, 2022, each of which is hereby incorporated by reference in its entirety.

TECHNICAL FIELD

The disclosed embodiments relate generally to media provider systems including, but not limited to, systems and methods for media segmentation.

BACKGROUND

Recent years have shown a remarkable growth in consumption of digital goods such as digital music, movies, books, and podcasts, among many others. The overwhelmingly large number of these goods often makes navigation of digital goods an extremely difficult task. Some digital goods, such as podcasts, are conversational in nature and can include multiple topics. Users may only be interested in some of the topics for a given podcast. Therefore, content discovery, understanding, and navigation can be further hindered by these topic changes.

SUMMARY

Podcasts tend to be long and cover multiple topics. However, users sometimes prefer to skip straight to a specific part of a podcast episode that they care about. A small number of podcasts and other audio media have chapter annotations supplied by creators with timestamps for when chapters start. However, a large number of podcasts are lacking such creator-provided chapter annotations.

The disclosed embodiments include training a machine learning model to learn from existing chapter annotation data (e.g., a supervised model) to predict where chapter boundaries should occur when they are not given by a content creator. Some embodiments include inputting the supervised chapter timestamps as labels, and a combination of the text transcript and audio features of the podcast as input data. Some methods for predicting chapter-like segmentation points for podcasts are unsupervised, e.g., don't leverage human-annotated chapter data but rather look at significant change points in the data (e.g., identify large semantic changes). The change points may be computed based on taking fixed-sized windows over the transcript and comparing the vector representation of adjacent windows, either as semantic embeddings or word-based topic distributions. However, in some circumstances these methods perform more poorly than the supervised models.

Some embodiments disclosed herein include a model for predicting sections in audio content. In some embodiments, the model uses text in conjunction with audio data (e.g., music). In some circumstances, the chapter transitions are sparse (e.g., only 2-3 transitions in a 30-minute podcast) and training the model includes only sampling data points (e.g., segments) that contain transitions.

In accordance with some embodiments, a method of segmenting media content is provided. The method is performed at a computing device having one or more processors and memory. The method includes: (i) obtaining audio content for a podcast; (ii) generating sentence embeddings for the audio content; (iii) generating segment embeddings using the sentence embeddings and context information; (iv) determining, for each segment embedding, whether the segment embedding includes a topic transition for the podcast; and (v) generating one or more topic transition timestamps for the podcast in accordance with the determination. In some embodiments, the audio content includes a transcript. In some embodiments, the sentence embeddings are generated based on audio data and/or a transcript from the audio content.

Some embodiments disclosed herein involve segmentation of audio content (e.g., for subsequent production and/or recommendation to users). For example, an audio content episode such as a podcast episode (or audio from a video or a live stream) is analyzed to identify relevant audio segments. As an example, audio segments are identified by analyzing the contents of the episode for characteristics such as topics, speakers, duration, music, and advertisements. The audio segments are trimmed portions of the audio content episode that are shorter and more easily consumed. The start of an identified audio segment may be selected to highlight a particularly relevant and/or interesting portion of the audio content episode. For example, an audio content episode may have a duration in the range of minutes to several hours long whereas the identified audio segments may each have a duration in the range of 1 minute to 10 minutes.

As an example, an audio content episode may be analyzed to identify audio segments featuring only a single speaker with few interruptions. As another example, the identified audio segments may be selected such that the segment only covers a single discussion topic rather than jumping between multiple topics in a short time span. Additionally, the identified audio segments may be trimmed to filter out less relevant portions, such as advertisements, introductions, closings, and/or music interludes.

In accordance with some embodiments, a method of segmenting media content is provided. The method is performed at a computing device having one or more processors and memory. The method includes: (i) obtaining spoken word audio content (e.g., for a podcast or show); (ii) identifying a highlight in the audio content using one or more positive signals and one or more negative signals; (iii) identifying a local similarity minimum in the audio content using adjacent sentence similarity information; (iv) defining a media segment having a start time based on the highlight and an end time based on the local similarity minimum; and (v) providing the media segment to a user. In some embodiments, the spoken word audio content includes a transcript and/or audio data.

In accordance with some embodiments, a computing system is provided, such as a streaming system, a server system, a personal computer system, or other electronic device. The computing system includes one or more processors and memory storing one or more programs. The one or more programs include instructions for performing any of the methods described herein.

In accordance with some embodiments, a non-transitory computer-readable storage medium is provided. The non-transitory computer-readable storage medium stores one or more programs for execution by a computing system with one or more processors. The one or more programs comprising instructions for performing any of the methods described herein.

Thus, devices and systems are disclosed with methods for segmentation, publication, and/or distribution of media content. Such methods, devices, and systems may complement or replace conventional methods, devices, and systems for segmentation of audio content.

BRIEF DESCRIPTION OF THE DRAWINGS

The embodiments disclosed herein are illustrated by way of example, and not by way of limitation, in the figures of the accompanying drawings Like reference numerals refer to corresponding parts throughout the drawings and specification.

DETAILED DESCRIPTION

Figure 1:
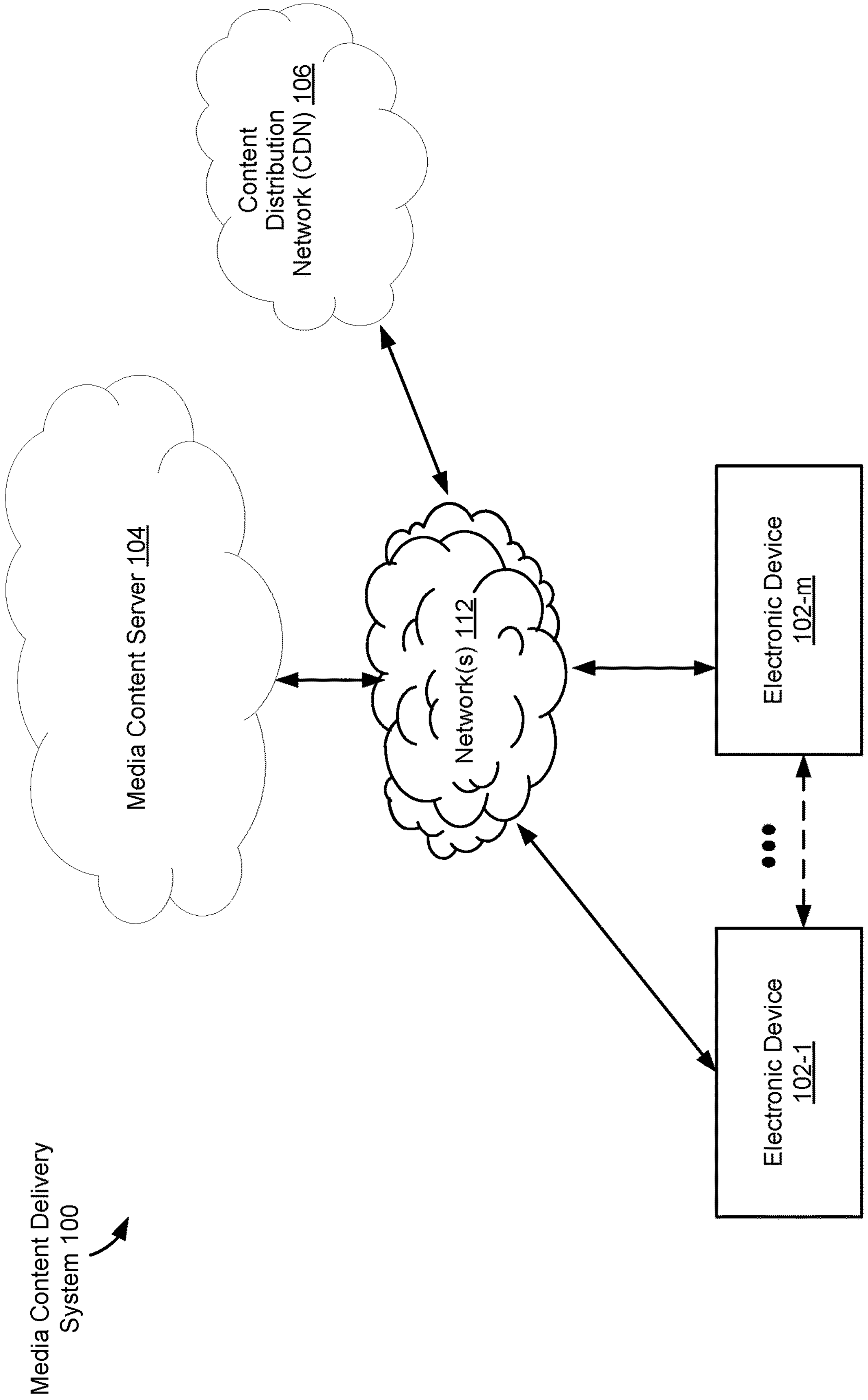
FIG. 1 is a block diagram illustrating a media content delivery system in accordance with some embodiments.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Podcasts are a quickly growing audio medium that require new systems and methods of information segmentation, sorting, summarization, and retrieval. Segmenting podcasts into chapters (e.g., structurally and topically coherent sections) is a more difficult problem than segmenting structured text due to spontaneous speech, multiple (overlapping) speakers, non-speech audio, and/or transcription errors from automatic speech recognition systems. As described herein, creator-provided timestamps may be used as labels to perform supervised learning. Binary classification may be performed on sentences from podcast transcripts and a supervised model may be trained and utilized. The systems and methods described herein address technical challenges such as high data imbalance (e.g., few chapter transitions per episode), and finding an appropriate context size (e.g., how many sentences are shown to the model during inference).

As an example, some users consider spoken word media content, such as podcasts, talk shows, and the like, to be too long to be enjoyably consumed. These users may therefore prefer to be able to easily jump between segments and topics of interest. In some embodiments, monolithic audio media episodes are tagged with timestamps to identify where each topic or regions of interest starts and/or ends. In some embodiments, the segmentation process is achieved using a combination of machine learning models (e.g., to identify naturally occurring semantic breaks and/or topic changes) and content criteria (e.g., regarding content features and segmentation duration). In some embodiments, the content criteria includes one or more of: a minimum and/or maximum segment length, a segment topic coherence, and a total number of segments.

Some conventional systems generate fixed-length segments from audio content. However, fixed-length segmentation does not take into account topic changes, transitions, and other speech-based segmentation boundaries. For example, fixed-length segmentation does not utilize signals from content creators regarding acceptable chapter boundaries.

Conventionally, creators can manually add timestamps to their podcasts, videos, and other media. However, creators have to manually find appropriate topic changes and add the timestamps. This requires extra time and effort by the creators. As described herein, topic changes within spoken word media content (e.g., podcast episodes) may be automatically identified using one or more of: machine learning models, constraints (e.g., segment duration and feature requirements), content understanding, and user behavior data and systems. Additionally, standalone segments (e.g., clips) may be generated using the timestamp information and the standalone segments may be used to generate segment sequences (e.g., playlists).

A clip system may provide the ability to extract short clips (e.g., one minute or less) of interesting content from episodes as a mechanism for discovery and previewing an episode. However, in some situations, these clips are of insufficient length to provide a stand-alone listening experience or fulfill a mixed-media talk experience.

As described herein, a spoken word media segmentation system may use pretrained word and sentence embedding models to perform a text segmentation task, e.g., finding points of minimum semantic similarity within media transcripts. Additionally, heuristics may be applied to select the start and end points that satisfy segment-length requirements. In some embodiments, the segmentation system identifies interesting regions based on both transcript and audio signals and applies heuristics to rank and filter the best segments.

Media Content Delivery System

FIG. 1 is a block diagram illustrating a media content delivery system 100 in accordance with some embodiments. The media content delivery system 100 includes one or more electronic devices 102 (e.g., electronic device 102-1 to electronic device 102-*m*, where m is an integer greater than one), one or more media content servers 104, and/or one or more content distribution networks (CDNs) 106. The one or more media content servers 104 are associated with (e.g., at least partially compose) a media-providing service. The one or more CDNs 106 store and/or provide one or more content items (e.g., to electronic devices 102). In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, an infotainment system, digital media player, a speaker, television (TV), and/or any other electronic device capable of presenting media content (e.g., controlling playback of media items, such as music tracks, podcasts, videos, etc.). Electronic devices 102 may connect to each other wirelessly and/or through a wired connection (e.g., directly through an interface, such as an HDMI interface). In some embodiments, electronic devices 102-1 and **102-*m* are the same type of device (e.g., electronic device 102-1 and electronic device 102-*m* are both speakers). Alternatively, electronic device 102-1 and electronic device 102-*m*** include two or more different types of devices.

In some embodiments, electronic devices 102-1 and **102-*m* send and receive media-control information through network(s) 112. For example, electronic devices 102-1 and 102-*m* send media control requests (e.g., requests to play music, podcasts, movies, videos, or other media items, or playlists thereof) to media content server 104 through network(s) 112. Additionally, electronic devices 102-1 and 102-*m*, in some embodiments, also send indications of media content items to media content server 104 through network(s) 112. In some embodiments, the media content items are uploaded to electronic devices 102-1 and 102-*m* before the electronic devices forward the media content items to media content server 104**.

In some embodiments, electronic device 102-1 communicates directly with electronic device **102-*m* (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-*m*. In some embodiments, electronic device 102-1 communicates with electronic device 102-*m* through network(s) 112. In some embodiments, electronic device 102-1 uses the direct connection with electronic device 102-*m* to stream content (e.g., data for media items) for playback on the electronic device 102-*m***.

In some embodiments, electronic device 102-1 and/or electronic device **102-*m* include a media application 222 (FIG. 2) that allows a respective user of the respective electronic device to upload (e.g., to media content server 104), browse, request (e.g., for playback at the electronic device 102), and/or present media content (e.g., control playback of music tracks, playlists, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). The electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, or an infotainment system of a vehicle). In some embodiments, the CDN 106 sends media content to the electronic device(s) 102**.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, audiobooks, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "episodes," "segments," "chapters," "clips," "tracks," and/or "audio tracks").

In some embodiments, media content server 104 receives media requests (e.g., commands) from electronic devices 102. In some embodiments, media content server 104 includes a voice API, a connect API, and/or key service. In some embodiments, media content server 104 validates (e.g., using key service) electronic devices 102 by exchanging one or more keys (e.g., tokens) with electronic device(s) 102.

In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
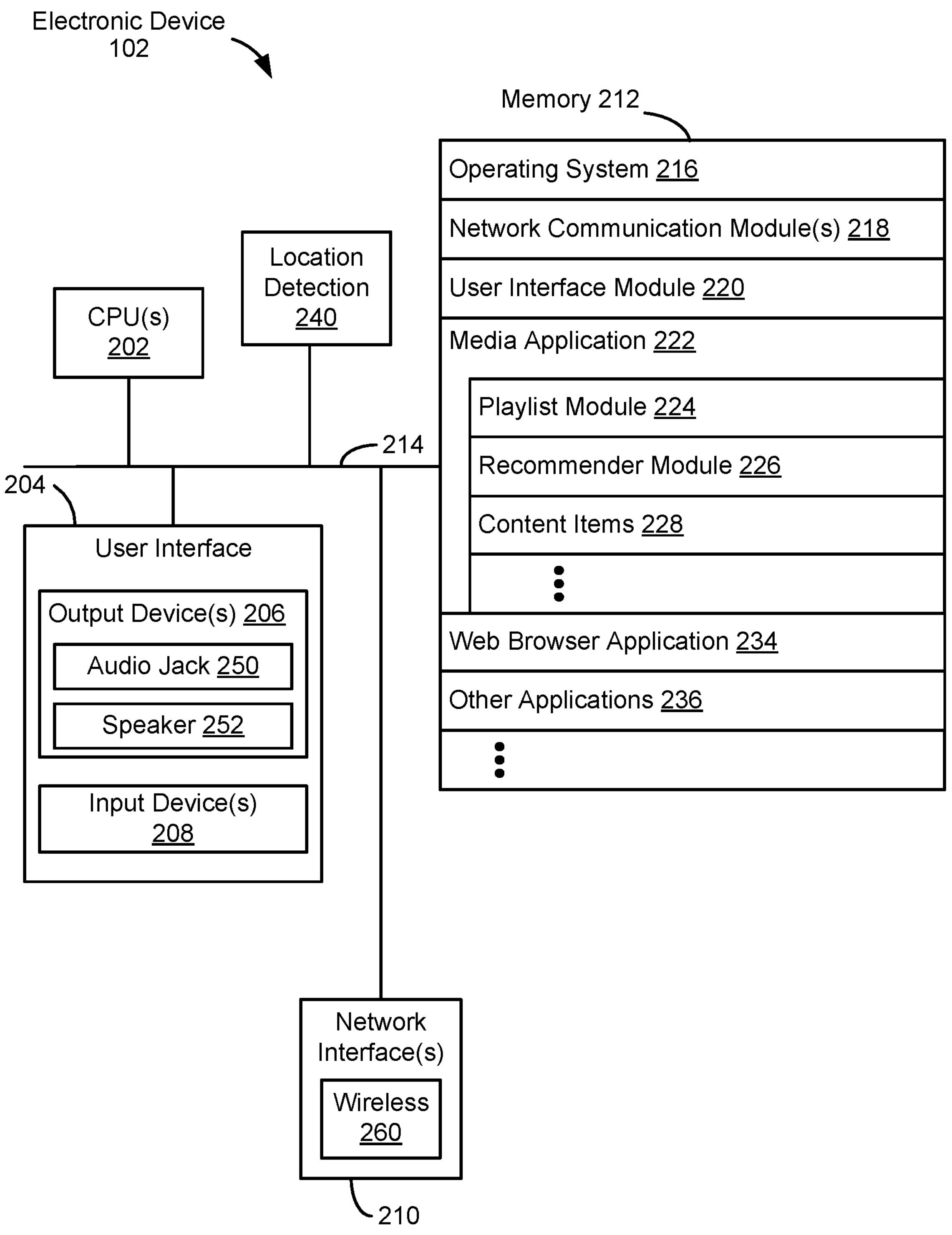
FIG. 2 is a block diagram illustrating an electronic device in accordance with some embodiments.

FIG. 2 is a block diagram illustrating an electronic device 102 (e.g., electronic device 102-1 and/or electronic device **102-*m*, FIG. 1), in accordance with some embodiments. The electronic device 102 includes one or more central processing units (CPU(s), e.g., processors or cores) 202, one or more network (or other communications) interfaces 210, memory 212, and one or more communication buses 214 for interconnecting these components. The communication buses 214** optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone and voice recognition device to supplement or replace the keyboard. Optionally, the electronic device 102 includes an audio input device (e.g., a microphone) to capture audio (e.g., speech from a user).

Optionally, the electronic device 102 includes a location-detection device 240, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, media presentations systems, and/or or other wireless (e.g., Bluetooth-compatible) devices (e.g., for streaming audio data to the media presentations system of an automobile). Furthermore, in some embodiments, the wireless interface 260 (or a different communications interface of the one or more network interfaces 210) enables data communications with other WLAN-compatible devices (e.g., a media presentations system) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

- an operating system 216 that includes procedures for handling various basic system services and for performing hardware-dependent tasks;
- network communication module(s) 218 for connecting the client device 102 to other computing devices (e.g., media presentation system(s), media content server 104, and/or other client devices) via the one or more network interface(s) 210 (wired or wireless) connected to one or more network(s) 112;
- a user interface module 220 that receives commands and/or inputs from a user via the user interface 204 (e.g., from the input devices 208) and provides outputs for playback and/or display on the user interface 204 (e.g., the output devices 206);
- a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof:
  - a playlist module 224 for storing sets of media items for playback in a predefined order;
  - a recommender module 226 for identifying and/or displaying recommended media items to include in a playlist; and
  - a content items module 228 for storing media items, including audio items such as podcasts and songs, for playback and/or for forwarding requests for media content items to the media content server;
- a web browser application 234 for accessing, viewing, and interacting with web sites; and
- other applications 236, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
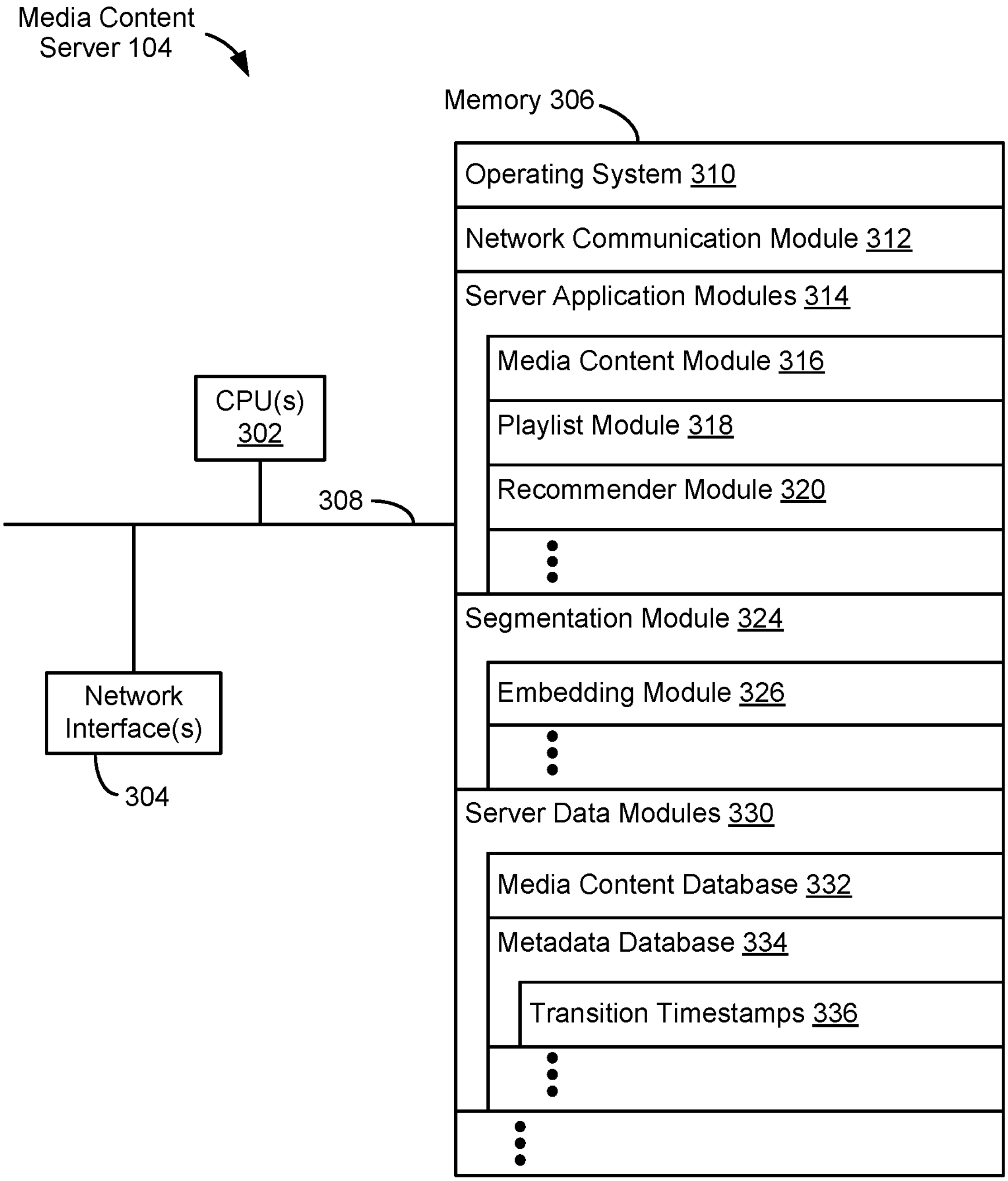
FIG. 3 is a block diagram illustrating a media content server in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random-access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

- an operating system 310 that includes procedures for handling various basic system services and for performing hardware-dependent tasks;
- a network communication module 312 that is used for connecting the media content server 104 to other computing devices via one or more network interfaces 304 (wired or wireless) connected to one or more networks 112;
- one or more server application modules 314 for performing various functions with respect to providing and managing a content service, the server application modules 314 including, but not limited to, one or more of:
  - a media content module 316 for storing one or more media content items and/or sending (e.g., streaming), to the electronic device, one or more requested media content item(s);
  - a playlist module 318 for storing and/or providing (e.g., streaming) sets of media content items to the electronic device;
  - a recommender module 320 for determining and/or providing recommendations for a playlist; and
  - a segmentation module 324 for segmenting media content and creating transition timestamps. In some embodiments, the segmentation module 324 includes an embedding module 326 for generating embeddings, such as token, sentence, and segment embeddings; and
- one or more server data module(s) 330 for handling the storage of and/or access to media items and/or metadata relating to the media items; in some embodiments, the one or more server data module(s) 330 include:
  - a media content database 332 for storing media items; and
  - a metadata database 334 for storing metadata relating to the media items, such as a genre associated with the respective media items. In some embodiments, the metadata database includes one or more transition timestamps 336 for the respective media items.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (e.g., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Segmentation Processes

Figure 4:
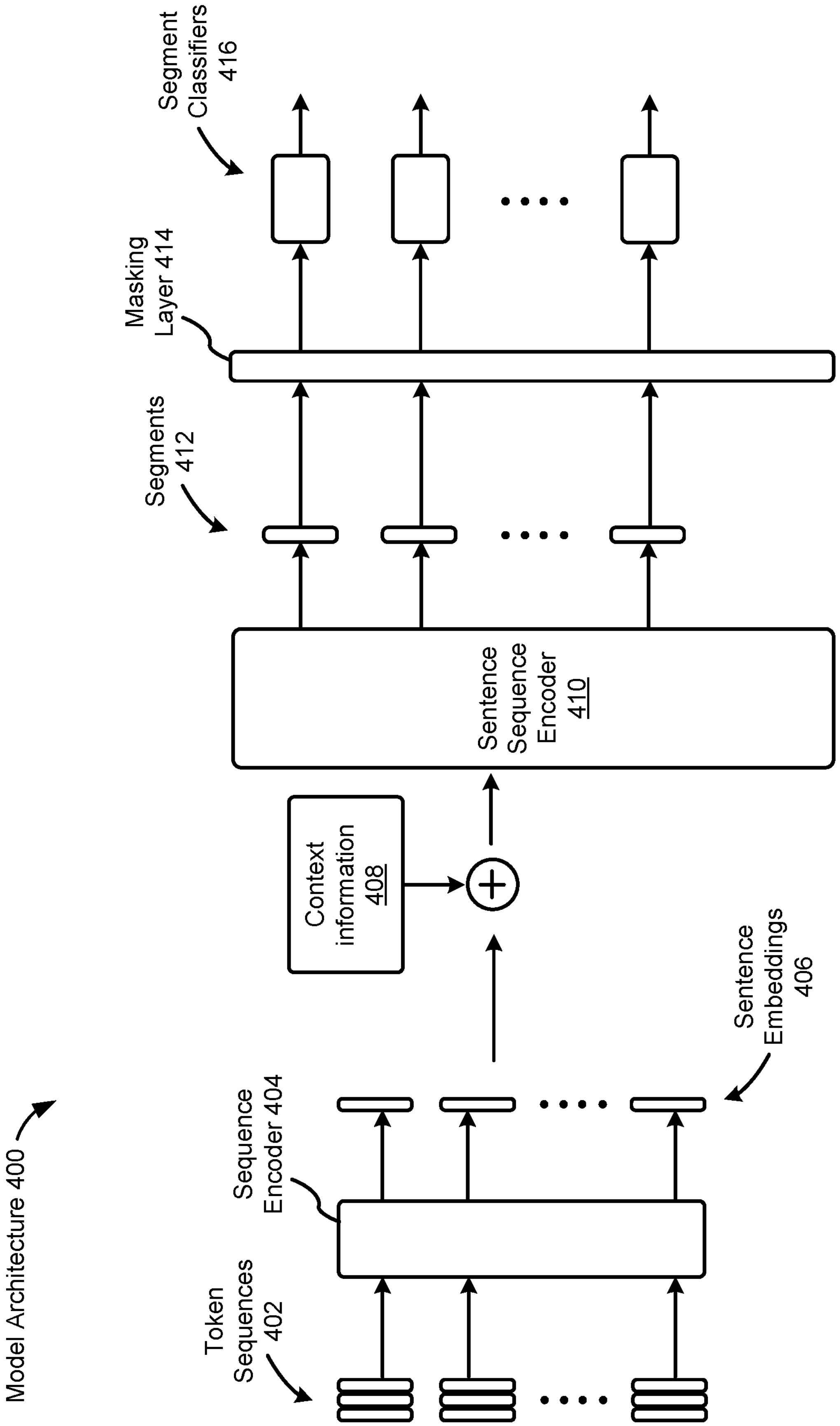
FIG. 4 is a block diagram illustrating a model architecture in accordance with some embodiments.

FIG. 4 is a block diagram illustrating a model architecture 400 in accordance with some embodiments. The architecture 400 includes tokenizing an input transcript to generate token embeddings 402 in accordance with some embodiments. The token embeddings 402 are input into a token sequence encoder 404 to generate sentence embeddings 406. In some embodiments, the token sequence encoder 404 is or includes a transformer (such as a sentence-BERT transformer). The sentence embeddings 406 are input into a sentence sequence encoder 410 to generate segment embeddings 412 (also sometimes called sentence sequences or windows). In some embodiments, the sentence embeddings 406 are combined with context information 408 (e.g., positional encodings) prior to being input into the sentence sequence encoder. In some embodiments, the context information 408 includes information from the audio data (e.g., music detection, ad detection, pause detection, breath detection). In some embodiments, the context information 408 includes speaker information for each sentence. In some embodiments, each segment embedding 412 corresponds to a set of sentence embeddings 406 (e.g., 30, 40, or 50 sentence embeddings per segment embedding).

In some situations, using smaller sets of sentence embeddings 406 (e.g., 30 embeddings) reduces or prevents overfitting of the model architecture 400 during training. In some embodiments, during training, the segment embeddings 412 are input into one or more masking layers 414 to mask a portion of the features. For example, the masking layer(s) 414 may mask 70%, 80%, or 90% of the non-transition sentences in the segment embedding 412. In situations where training data is sparse, the masking layer(s) 414 may be used for contrastive learning to expand the training dataset. In some embodiments, the training dataset is expanded by selecting multiple segments for each labeled transition. For example, a segment having the transition near the beginning (more context after the transition); a segment having the transition near the end (more context before the transitions); and a segment having the transition near the middle (some context before and after the transition). In some embodiments, the number of segments for each labeled transition is limited to prevent overfitting by the model (e.g., 3, 4, or 5 segments generated for each labeled transition).

The (masked) segment embeddings 412 are input into one or more segment classifiers 416 to determine whether each segment embedding includes a topic (or chapter) transition. In some embodiments, post-processing is performed on the segment classifier 416 outputs, e.g., to prevent multiple transition labels in quick succession, or to select a transition label having a highest confidence score. For example, the post-processing may prevent selection of a transition within a preset number of sentences from an earlier transition (e.g., 3, 5, or 10 sentences). In some embodiments, the segment classifiers 416 are configured to output a value (e.g., a confidence value between 0 and 1) and the value is compared to a preset threshold (e.g., a threshold of 0.7, 0.8, or 0.9) to determine whether a transition has occurred. In some situations, the media content corresponds to a conversation without well-defined topic transitions. In these cases, having a higher preset threshold improves selection of a topic transition.

In some embodiments, training data is obtained by searching a media database (e.g., the media content database 332) for media with chapter labels (e.g., transition timestamps). In some embodiments, text transcripts are generated for the media with the chapter labels and the text transcripts are input into the model architecture 400.

The model architecture 400 corresponds to a hierarchical segmentation transformer architecture. In some embodiments, the sequence encoder 404 is a pretrained sentence encoder that outputs sentence embeddings. In some embodiments, the sentence embeddings are put into batches with bs data points, shaped (bs, seq_len, embed_dim), where seq_len is the context size, and embed_dim the embedding size. In some embodiments, each batch is input to a context encoder to generate contextualized representations. In some embodiments, the contextualized representations are put into a linear classification layer with a sigmoidal activation function. During training, the data points may be masked by the masking layer 414.

In some embodiments, stochastic weight averaging is used during training. In some embodiments, to prevent overfitting, dropout regularization (e.g., with p=0.1) is used with the transformer context encoder and/or before the last linear layer. In some embodiments, early stopping is used on the validation loss. In some embodiments, controllable parameters for the segmentation model include batch size, number of attention heads, hidden layer dimension in the transformer feed-forward layer, and/or the number of encoder layers.

Figure 5:
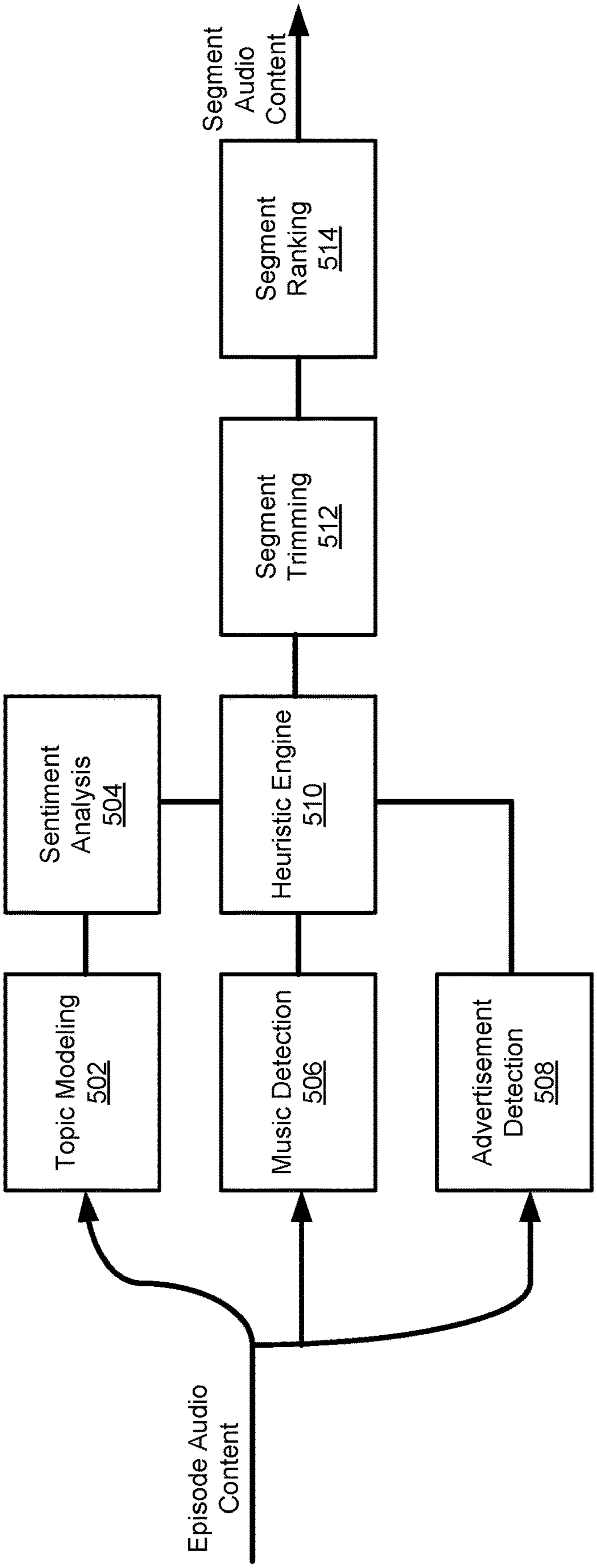
FIG. 5 is a block diagram illustrating a segmentation process in accordance with some embodiments.

FIG. 5 is a block diagram illustrating a segmentation process in accordance with some embodiments. In the example of FIG. 5, episode audio content is obtained (e.g., corresponding to podcasts, videos, and other types of audio and audiovisual media). The episode audio content is input to a topic modeling component 502 (e.g., a latent Dirichlet allocation (LDA) model), a music detection (and analysis) component 506, and an advertisement detection component 508. In some embodiments, the topic modeling component 502 is configured to extract topic proportions of 'K' pre-modelled topics in an input text, each being a distribution of words. The output of the topic modeling component 502 (e.g., topic proportion information) is input into a sentiment analysis component 504 (e.g., a transformer model such as ALBERT). In some embodiments, the sentiment analysis component 504 is configured to compute the last attention layer output of an aspect-based sentiment analysis transformer network for a given text and weighted terms that may appear in the text.

In some embodiments, the advertisement detection component 508 and/or the music detection component 506 includes a transformer model (e.g., a BERT-based model such as ALBERT). In some embodiments, the advertisement detection component 508 and/or the music detection component 506 identify portions of the episode audio content that are non-verbal (e.g., of low interest to users). In some embodiments, the music detection component 506 is configured to compute Mel-frequency cepstral coefficient (MFCC) features, and predict sound labels for a given audio file or chunk. In some embodiments, the advertisement detection component 508 is configured to compute a windowed average of whether any given n-second slice of a transcript contains an ad given a text input.

In accordance with some embodiments, the output of each of the sentiment analysis component 504, the music detection component 506, and the advertisement detection component 508 is input into a heuristic engine 510 to combine into an overall signal. In some embodiments, the heuristic engine 510 identifies start and end points for segments. In some embodiments, the heuristic engine 510 is configured to take a time-series input, a transcription, and time constraints to transform the time series based on transcript information, compute peak regions in the resulting series, and return a list of offsets matching the given constraints.

The output of the heuristic engine 510 (e.g., untrimmed segments) is input to a segment trimming component 512. In some embodiments, the segment trimming component 512 provides adjustments to the start and end points identified by the heuristic engine 510 (e.g., based on an ALBERT model and/or additional heuristics). In some embodiments, the segment trimming component 512 is configured to compute (given a transcript, start time, and end time) a new start and end time that is editorially more appropriate. For example, a start time may be moved to include one or more introductory sentences so that a listener is given more context for a subsequent discussion. As another example, an end time may be moved to include one or more summary or conclusory sentences (e.g., an outro).

The output of the segment trimming component 512 (e.g., trimmed segments) is input into a segment ranking (and optionally classification) component 514. In some embodiments, the segment ranking component 514 comprises a transformer model (e.g., an ALBERT model). In some embodiments, the segment ranking component 514 is configured to compute a binary classification score for each segment in a given list of segments (e.g., start and end times) (and/or their transcripts) based on their editorial correctness. In some embodiments, the output of the segment ranking component 514 is a ranked set of segments (which may be provided and/or recommended to users). In some embodiments, an output of the heuristic engine 510, the segment trimming component 512, and/or the segment ranking component 514 is provided to the model architecture 400 (e.g., provided as the context information 408) so that the segment classifications are based on the output(s) from the heuristic engine 510, the segment trimming component 512, and/or the segment ranking component 514. In some embodiments, an output of the heuristic engine 510, the segment trimming component 512, and/or the segment ranking component 514 is provided to the segmentation process shown in FIG. 6 (e.g., provided as additional features 612) so that the segmentation is based on the output(s) from the heuristic engine 510, the segment trimming component 512, and/or the segment ranking component 514.

Figure 6:
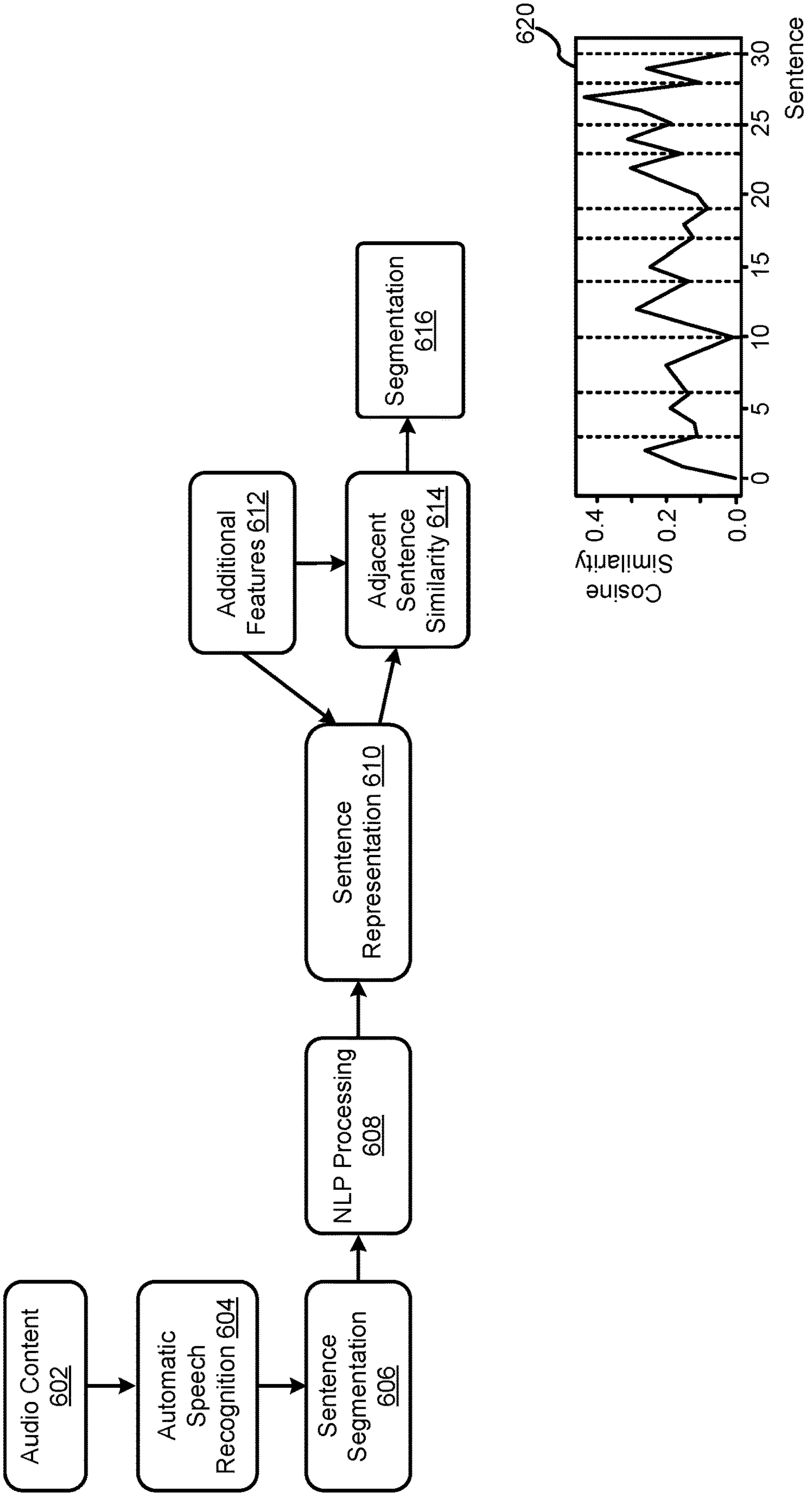
FIG. 6 is a block diagram illustrating another segmentation process in accordance with some embodiments.

FIG. 6 is a block diagram illustrating another segmentation process in accordance with some embodiments. The segmentation process in FIG. 6 includes obtaining audio content 602, such as spoken word media content audio data. Text of the audio content 602 is obtained via automatic speech recognition 604 (ASR). In some embodiments, the text includes one or more timestamps, such as a timestamp for each word. Sentence segmentation 606 is applied to segment the text into sentences. In some embodiments, the sentence segmentation 606 includes a natural language processing (NLP) model. NLP processing is performed on sentences from the sentence segmentation 606 to generate processed sentences. In some embodiments, the NLP processing includes character normalization, stemming, lemmatization, and/or stop word removal. Sentence representation 610 converts the processed sentences to corresponding representations. In some embodiments, the corresponding representations are vector representations (e.g., generated using one or more of word2vec, TF-IDF, LDA, BERT, and sentence transformers). In some embodiments, additional features 612 are combined with the sentence representations (e.g., to improve quality). The additional features 612 may include one or more of: raw audio spectrograms, user listening behavior, speaker identification, sentiment analysis, ad detection, and music detection.

Adjacent sentence similarity 614 is performed using the additional features 612 and the sentence representations. In some embodiments, a model is used to score each potential cut point between sentences based on the sentence representation and additional features. In some embodiments, the cut point scoring includes similarity scores between windows of sentences and clustering. In some embodiments, a model is used to select a limited number of cut points based on local minimum (or maximum) cut scores, depth of score relative to neighbors, and logic to meet the requirements of a feature for the number of segments or the time requirements for segment length. The graph 620 in FIG. 6 shows an example relationship between cosine similarity and sentences with local minimums indicated with dotted lines. In some embodiments, one or more local minimums are selected as cut points for segmentation. In some embodiments, a subset of the local minimums are selected based on context information, such as desired segmentation length, topic identification, advertisement detection, and/or other audio features. In some embodiments, the context information includes one or more generated features, such as sentiment analysis, music detection, and ad detection. In some embodiments, the generated features are included in the heuristics to better capture areas of interest and avoid advertisements and music interludes. Segmentation 616 segments the audio content 602 based on the cut points and, optionally, additional features and/or context information.

In some embodiments, a contrastive learning approach is used to train and/or fine-tune a model (e.g., a sentence embedding model) with snippets from the same episode and/or different episodes of the same show. In some embodiments, the contrastive learning includes training with pairs of segments from the same episode vs segments from different episodes (e.g., from the same show). In this way, a model may be trained to more clearly distinguish between parts of the episode that are similar (e.g., same topics) and parts that are not. In some embodiments, the segment start point and/or end point selection is identified based on clustering. In some embodiments, the model is trained using an ad insertion system (e.g., based on identified ad insertion points).

In some embodiments, each audio segment is automatically tagged. For example, automatically determined tags may be used to categorize, recommend, and/or describe the identified audio segment. The tags may include internal tags that are only used for analysis as well as external tags (such as topic, category, and speaker tags) that are presented to users. For example, an audio segment for an entertainment audio content episode featuring Jane Doe may be tagged with the external tags '@janedoe' and '#entertainment' that are presented to users. In some embodiments, the tags are used for content discovery and/or determining episode recommendations for users. Once identified, particular audio segments may be selected and recommended to users, for example, by including recommended audio segments in a segment feed.

In some embodiments, audio content episodes are obtained. For example, audio content episodes (e.g., podcasts or talk show recordings) and/or the audio content from one or more videos are collected for processing. In some embodiments, the audio content episodes include both prerecorded and live (streaming) episodes. For example, a received audio content episode may correspond to a live audio stream. One or more audio segments of interest in each of the audio content episodes are identified using machine learning. For example, machine learning may be used to identify relevant audio segments from each of the received audio content episodes. The identified segments may be determined to be relevant to particular listeners. For example, the segments may include the more interesting portions of the audio content episodes and/or each identified audio segment may feature an extended discussion of a topic featured in the corresponding audio content episode. In some embodiments, the machine learning used to identify an audio segment of interest in each of the audio content episodes is based at least in part on an analysis of content included in the corresponding audio content episode. For example, the content of the audio content episodes may be analyzed by applying multiple machine learning models. The models may identify topics of discussion as well as speakers, advertisements, music, and other content signals within an audio content episode. Multiple machine learning models may be applied to identify different characteristics of the audio content. For example, a first machine learning model may be used to identify topics in the audio content and a second machine learning model may be used to identify interludes and/or non-speech audio features from the audio content.

In some embodiments, the results of different machine learning models are merged, for example, by applying one or more heuristics such as identifying positive signals as well as negative avoidance signals. Positive signals may be used to identify portions of the audio content that are relevant and should be featured as an audio segment while (negative) avoidance signals may be used to identify portions to avoid highlighting. In some embodiments, machine learning is applied to the audio of the received audio content episodes and/or to one or more transformed versions of the audio content episodes such as a transcription or frequency transform. In some embodiments, identified audio segments are selected based on the machine learning results from analyzing an audio content episode. In some embodiments, each of the identified audio segments is associated with one or more automatically determined tags. For example, content descriptive tags such as topic tags, speaker tags, and/or category tags are associated with each identified audio segment. The tags may include both internal tags that are only used for analysis as well as external tags that are presented to users. As an example, external tags may be more generalized whereas internal tags may include granular details describing specific portions of an episode including individual words and/or phrases of the audio content.

In some embodiments, machine learning is used to select, for a specific user, a recommended audio segment from the identified audio segments. For example, one or more machine learning models are used to select an identified audio segment for a particular user. The selection may be determined by first ranking the identified audio segments and then selecting the highest ranked segment. In some embodiments, the audio segment is selected as a recommendation for a specific user. In some embodiments, a recommended audio segment is based on attributes of the specific user and/or tags of the identified audio segments. For example, a user's attributes may include a set of defined and/or inferred interests. The tags for the identified audio segments may be used to match the identified audio segments to a user's interests.

In some embodiments, the recommended audio segments are selected to match a user's interest and/or expected interest. In some embodiments, the recommended audio segment is automatically provided in an audio segment feed. For example, an audio segment feed for a specific user may include recommended audio segments from different audio content episodes for the specific user. In this way, each specific user can quickly explore different audio content episodes by reviewing the user's audio segment feed. For example, a user can explore available audio content episodes by navigating through the user's audio segment feed and consuming recommended audio segments. The audio segment feed may be used to present recommended audio segments of different audio content episodes in a continuous manner. After an audio segment finishes playing, the next recommended audio segment may be automatically played without any user intervention. In some embodiments, a user is able to navigate between recommended audio segments and is presented with descriptions of each audio segment and corresponding audio content episode of the audio segment feed.

In some embodiments, a recommended audio segment provides a user with a preview of the corresponding audio content episode and allows the user to quickly determine what content to consume in the future. For example, a user can switch to listening to (or mark for future listening to) an audio content episode after first listening to the corresponding recommended audio segment of the episode included in their audio segment feed. As another example, in response to a recommended audio segment in their audio segment feed, a user can choose to ignore the corresponding audio content episode and skip to the next recommended audio segment in their audio segment feed. By including recommended audio segments from different audio content episodes, the audio segment feed allows a user to quickly explore different audio content episodes to identify which episodes to listen to. In some embodiments, future recommendations of audio segments take into account the user's behavior and interaction with their audio segment feed and the included recommended audio segments.

In some embodiments, recommended audio segments are provided to a user to allow the user to listen to only the particular portions of episodes that are of interest to the user. For example, the user can avoid listening to an entire episode and instead listen to audio segments from the episode (and optionally related episodes) that relate to the user's interests. In some embodiments, the recommended audio segments are provided to the user in a sequence or list (e.g., a playlist). In this way, the user may have a listening experience that includes only listening to relevant segments from episodes.

Figure 7A:
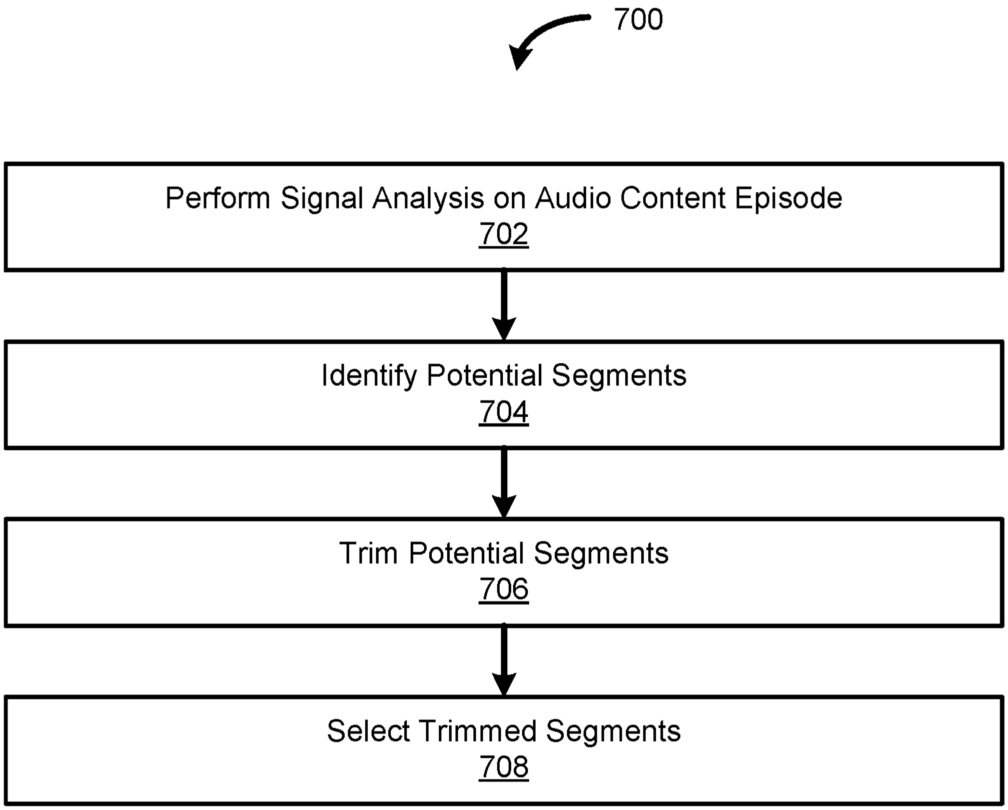
FIG. 7A is a flowchart illustrating an example process for analyzing an audio content episode to identify audio segments in accordance with some embodiments.

FIG. 7A is a flowchart illustrating a method 700 for analyzing an audio content episode to identify audio segments in accordance with some embodiments. In some embodiments, the method 700 is performed by a computing system (e.g., the media content server 104).

The computing system performs (702) signal analysis on an audio content episode. In some embodiments, as part of the analysis, the audio content episode is first transformed into one or more different input formats. For example, the audio content episode may be transcribed, and the transcription may be used as an input for content analysis. In some embodiments, one or more machine learning models are applied to the input data to determine content signals (e.g., as described previously with respect to FIGS. 4 and 5). Example content signals identified using the machine learning models include topics, speakers, advertisements, music, questions, monologues, and the like. For example, a machine learning model may be trained to identify which portions of content are long monologues with uninterrupted speech. As another example, a machine learning model may be trained to identify topics as they are covered in the audio content episode. Similarly, among other content signals, different machine learning models may be trained to identify when questions are asked, when advertisements occur, and/or when music is played in the audio content episode.

The computing system identifies (704) potential audio segments using the signals analysis results (e.g., via the segment classifiers 416 and/or heuristic engine 510). For example, the content signals identified at 702 are used to identify relevant audio segments within the audio content episode. In some embodiments, the identified content signals are merged together. For example, one or more heuristics are applied to each content signal and merged into a single cumulative content signal. The cumulative content signal may be a measurement of multiple characteristics of the audio content episode. In some embodiments, the cumulative content signal is a moving average. In some embodiments, the merged cumulative signal is analyzed to identify potential audio segments. For example, peaks (local maximums) and valleys (local minimums) are identified and may be used to designate relative start and stop times of a potential audio segment. Similarly, the area under the cumulative signal may be used to identify the highest value potential audio segment. In some embodiments, the analysis is performed on one or more identified signals, one of which may be a merged cumulative signal. For example, avoidance segments may be identified. The avoidance segments may be used to negate potential audio segments from being selected. For example, an avoidance segment may reference an advertisement segment, a music segment, or another segment that should not appear in a recommended audio segment. Music segments identified as avoidance segments may include segments where music is used to augment an introduction, transition, or closing and their inclusion in an audio segment does not make for strong potential audio segments for recommendations.

In some embodiments, the analysis to identify potential audio segments also automatically determines tags to associate with each potential audio segment. For example, the topic content signals may be used to identify one or more topic tags for a potential audio segment. As another example, a speaker content signal may be used to identify one or more speaker tags for a potential audio segment. In some embodiments, the tags are associated with the potential audio segment and may be used for categorizing the segment and/or the corresponding audio content episode. The identified tags may include both internal tags that are only used for analysis as well as external tags (such as topic, category, and/or speaker tags) that are presented to users. External tags may be more generalized whereas internal tags may include granular details describing specific portions of an episode including individual words and/or phrases of the audio content. For example, external tags may include #nba, #basketball, and #playoffs, whereas corresponding internal tags may additionally include #possession, #turnover, #threepointer, #steal, #error, #playoffs, #matchup, #finals, and #mvp.

In some embodiments, the computing system trims (706) potential segments. In some embodiments, the start and end points of a potential audio segment are selected to maximize the value of the segment. For example, a potential audio segment with a long monologue may be trimmed to only highlight the most captivating portion of the segment. As another example, a potential audio segment is trimmed to fit within a configurable time restriction, such as less than 10 minutes. In some embodiments, a machine learning model may be used to trim potential audio segments. The model may be trained by providing multiple trimmed audio segment candidates and allowing an operator to select the best trimmed audio segment. In some embodiments, the model is trained by observing user behavior with multiple candidate audio segments. For example, one or more different users are provided with different trimmed audio segment candidates and the user interaction is used as training data. The parameters of a trimmed potential audio segment such as the start and stop offsets used to trim the segment may be stored in a data store (such as the database 334) along with additional metadata of each potential audio segment.

The system selects (708) trimmed audio segments (e.g., for playlists and/or recommendations). For example, the trimmed audio segments are selected to determine the best candidates to retain. In some embodiments, the trimmed audio segments are ranked and/or filtered out to determine which segments to select. For example, a machine learning model may be used to select and/or rank the candidate trimmed audio segments. For each audio content episode, one or more audio segments may be selected. In some embodiments, the input for selection is an aggregate score based on the content analysis performed at 702. For example, an aggregate score may be used to evaluate the strength of each audio segment. In some embodiments, once selected, the tags for a selected trimmed audio segment are stored and associated with the selected trimmed audio segment. The automatically determined tags may be stored in a data store such as database 334 along with additional metadata of the segment. In some embodiments, only a subset of the tags is presented to the user and provided along with a recommended audio segment.

In some embodiments, a segment feed is provided that allows a user to navigate through different recommended audio segments, e.g., playing each segment to completion or skipping through to the next recommended segment. The segment feed may also allow a user to quickly access and listen to the corresponding audio content episode of a recommended audio segment and/or designate the corresponding audio content episode for later listening.

In some embodiments, the audio segment feed allows a user to automatically play, in a continuous manner, one audio segment after another. For example, once a first audio segment has finished playing, a second audio segment begins playing. In some embodiments, the automatic transition between audio segments may include an automatic fade-out and/or fade-in sequence and/or another audio and/or video indicator. In some embodiments, as an audio segment plays, a corresponding visual indicator for the current playing audio segment is displayed. The visual indicator may include information of the current audio segment and corresponding audio content episode such as the name of the episode, topics covered, speaker information, length, and publication date, among other properties. In some embodiments, additional visual indicators for queued and/or previously played audio segments are displayed along with the visual indicator of the current audio segment of the audio segment feed. For example, as the current audio segment plays, a user can simultaneously navigate the audio segment feed to inspect what audio segments are included in the feed. In some embodiments, a user is able to reorder audio segments, jump directly to a specific audio segment, remove an audio segment, mark an audio segment for additional actions, and otherwise navigate and interact with the audio segments in the audio segment feed. In some embodiments, an audio segment feed is created for a specific user or group of users based on user preferences and/or interests, among other factors. Different audio segment feeds may also be created for each user for different purposes, such as a daily feed, a news feed, an entertainment feed, a sports feed, a commute feed, etc.

As one of skill in the art will appreciate, aspects of the method 700 can be combined and/or replaced with aspects of the methods 750 and 780. The method 700 can include the operations of the methods 750 and 780. For example, the operation 704 can be replaced with the operation 754.

Figure 7B:
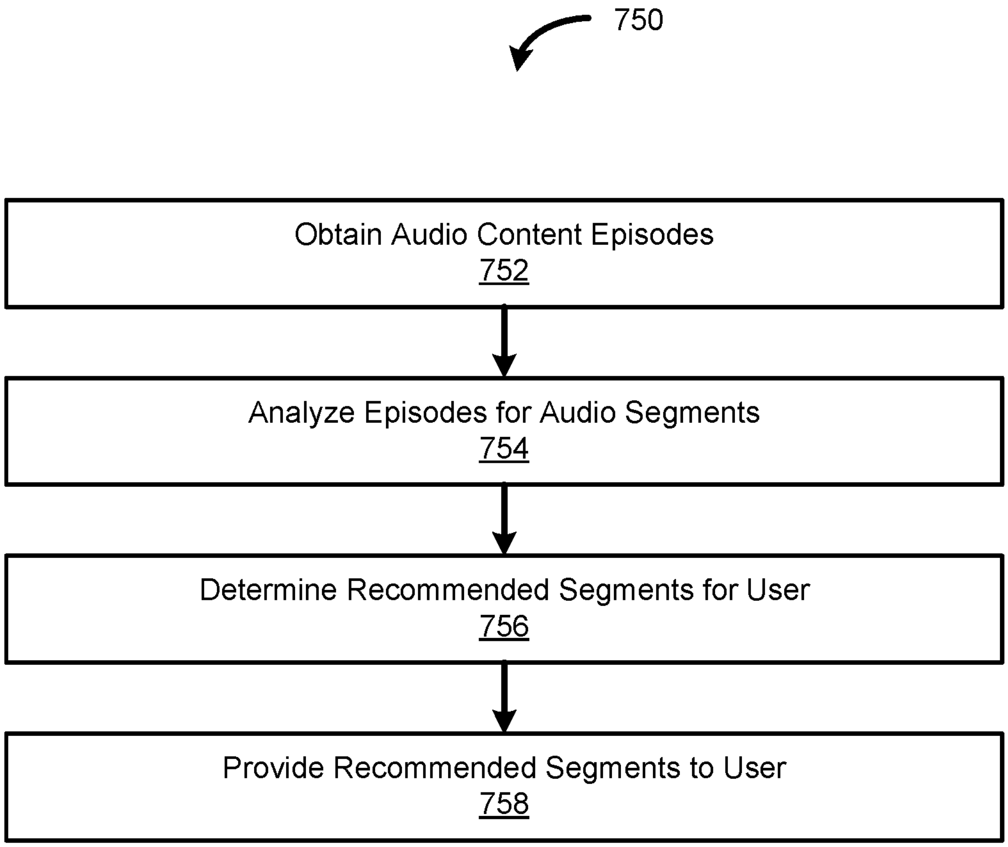
FIG. 7B is a flowchart illustrating an example process for analyzing audio content episodes for recommended audio segments in accordance with some embodiments.

FIG. 7B is a flowchart illustrating a method 750 for analyzing audio content episodes for recommended audio segments in accordance with some embodiments. In some embodiments, the method 750 is performed by a computing system (e.g., the media content server 104).

The system obtains (752) audio content episodes. For example, audio content episodes, such as podcast episodes, are received at an analysis server such as server 104 of FIG. 1. The episodes may be downloaded or captured from one or more audio content servers for hosting, broadcasting, publishing, or producing podcast or video episodes. In some embodiments, different podcast shows, and their corresponding audio content episodes may be available from different sources. In some embodiments, the audio content episodes correspond to one or more live audio episodes. For example, as an audio or video episode is being recorded, the live audio content is captured and received at 752. In some embodiments, the audio content is an audio channel of a video. For example, one or more audio channels of a video (either live or pre-recorded) is extracted and received at 752.

The system analyzes (754) audio content episodes for audio segments. For example, each of the audio content episodes obtained at 752 are analyzed, including analyzing the content of each audio content episode to identify audio segments. For example, the audio content episodes may be analyzed to extract different content signals, which are used to determine relevant audio segments. In some embodiments, one or more machine learning models are used to extract one or more content signals. For example, a first machine learning model may be used to identify the topics discussed in the audio episode, a second machine learning model may be used to identify speakers, and a third machine learning model may be used to identify advertisements. In some embodiments, the output from the analysis for one content signal is used as an input to identify a second content signal. The results of each content signal may be used to identify relevant audio segments. In some embodiments, the audio content is transformed to one or more different formats for analysis. For example, the audio content may be transcribed and analyzed as text-based input rather than audio input. As another example, the audio content may be transformed to a different domain such as the frequency domain before analysis is performed. In some embodiments, the results of the analysis performed on an audio content episode are one or more identified audio segments that are automatically tagged. The tags may be descriptive tags such as tags that identify speakers, topics covered, location of the podcast, genre, and other properties related to the audio content episode and segment. In some embodiments, the analysis includes identifying internally used tags used to determine recommended audio segments within an audio content episode. The internal tags may not be presented to a user (e.g., a listener) but are used for intermediate analysis steps.

The system determines (756) recommended audio segments for a user. For example, based on attributes specific to a user, audio segments are selected for recommendation. In some embodiments, only a subset of the identified audio segments is recommended to a user. For example, a user's preferences and/or interests are used to select the recommended audio segments from available identified audio segments. In some embodiments, a user's social graph is used to identify recommended audio segments. For example, a user can follow other users with similar listening tastes. In some embodiments, users are matched with recommendations at least in part by matching a user's attributes with the automatically determined tags of the identified audio segments. For example, a user can express interest in topics associated with the tags #Business, #Parenting, #Sport, #Technology, and #Wellness, among others. Users can also specify more detailed tags such as #basketball, #GoldenStateWarriors, and #NBA. The specified tags are used to select recommended audio segments from the audio segments identified at 754.

The system provides (758) recommended audio segments as a segment feed. For example, a segment feed is created that includes the recommended audio segments determined at 756. In some embodiments, the segment feed is a playlist of recommended audio segments. For example, a user can receive the segment feed and navigate through the recommended audio segments included in the feed. A user can skip through or past audio segments, deciding whether to mark the corresponding audio content episode for further listening. In some embodiments, an audio segment feed is used to play each recommended audio segment in the feed automatically without interruption. As one recommended audio segment completes, the next audio segment begins playing. In some embodiments, the audio segment feed is continuously replenished with new recommendations (e.g., in response to user interactions). In some embodiments, a user can receive and/or subscribe to one or more segment feeds. Custom segment feeds may be created for a user based on preferences, scope, and other attributes. For example, different segment feeds may be provided and may include a daily news feed, an entertainment feed, a politics feed, a friends feed, a work feed, etc. In some embodiments, feeds may be provided for an individual specific user or for a group of users.

In some embodiments, a recommended audio segment is utilized to create a highlight clip (e.g., a segment with a duration of less than 2 minutes or 1 minute). The highlight clip may include the audio of the recommended audio segment and may be provided as shareable content with a reference to the corresponding content episode and/or uploaded for hosting at a variety of different content media providers, such as video content distributors. For example, a highlight clip that includes the recommended audio segment may be shared via email, social media, or other mediums to introduce users to the corresponding content episode. Since the recommended audio segment is a highlight of the audio (or video) content episode, playing of the highlight clip provides users with a preview/excerpt of the full content episode. In some embodiments, a video portion of the highlight clip includes visual indictors of the audio segment and/or corresponding content episode. For example, a video clip may include the name of the episode, speakers of the episode, subtitles and speaker information synchronized for playing with the recommended audio segment, tags corresponding to the audio segment and/or episode, a reference to the corresponding episode, references to related content episodes or audio segments, and/or a reference to content applications and/or platforms for playing the corresponding episode, among other related information. If the recommended audio segment is extracted from a video content episode, the highlight video clip may include both the recommended audio segment as well as the corresponding video segment from the video content episode. In some embodiments, the highlight video clip includes multiple recommended audio segments extracted from the same audio or video content episode. For example, the highlight video clip may include three of the top recommended audio segments of an audio content episode. The highlight video clip may also include multiple recommended audio segments extracted from different episodes of the same show, such as a podcast show or video show. For example, three recommended audio segments (and corresponding video portions) are selected from episodes of a podcast show to highlight to users the podcast show rather than an individual episode of the show. Similarly, the recommended audio segments may be extracted from different podcast shows and content media (such as videos) to introduce users to the associated content, related content, and/or content platform.

In some embodiments, content creators and/or publishers are able to utilize the disclosed techniques to extract highlighted portions of their content. For content episodes that have long durations (runtimes), the ability to efficiently identify recommended segments from an episode allows a creator/publisher to provide an easily consumed preview or excerpt of the episode to users. The recommended segments may include references to access, play, and/or retrieve the associated content. For example, a highlight webpage can include one or more highlight video clips and/or recommended audio segments. The highlight webpage can be shared via email, social media, or other mediums. The highlight webpage allows users to preview the associated content along with additional information and/or metadata identified by analyzing the content such as topic tags, speaker tags, subtitles, episode lists, related episodes such as episodes of other shows that include the same or similar topics and/or speakers, and the ability to retrieve and/or subscribe to the episode, among other actions. Although described with respect to audio content, the disclosed techniques are applicable to analyzing video content as well. By analyzing the audio content of a video, the identified recommended audio segments correspond to recommended video segments of the full video. The recommended audio segments may be shared as highlights of the full video either with or without the corresponding video highlights. When prepared as video clips, the recommended audio segments may include the corresponding video segment along with additional information and/or metadata identified by analyzing the audio content.

As one of skill in the art will appreciate, aspects of the method 750 can be combined and/or replaced with aspects of the methods 700 and 780. The method 750 can include the operations of the methods 700 and 780. For example, the operation 754 can be replaced with operations of the method 780.

Figure 7C:
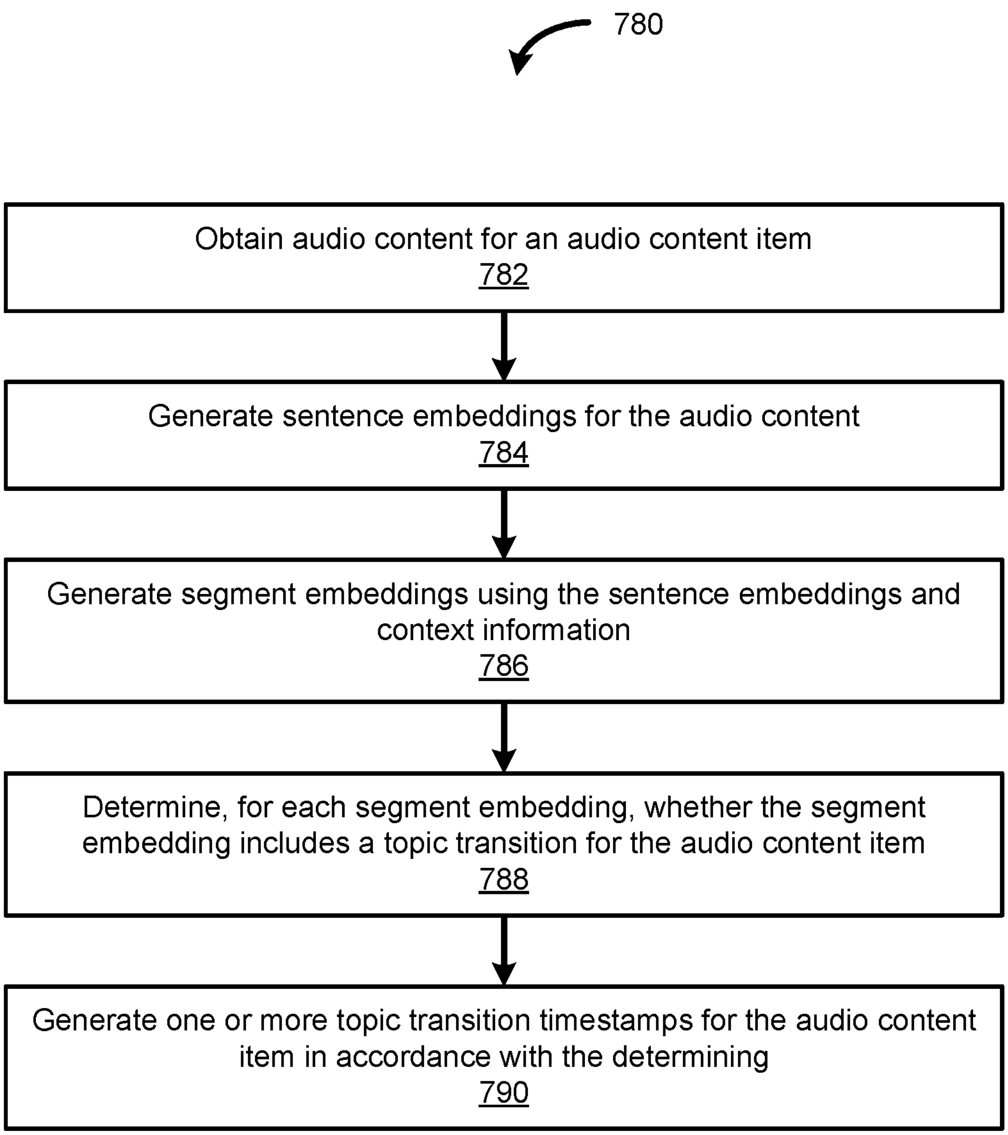
FIG. 7C is a flowchart illustrating an example process for generating timestamps for audio content in accordance with some embodiments.

FIG. 7C is a flowchart illustrating a method 780 for generating timestamps for audio content in accordance with some embodiments. In some embodiments, the method 780 is performed by a computing system (e.g., the media content server 104). In some embodiments, the computing system generates the timestamps using one or more machine learning models (e.g., using the model architecture 400).

The computing system obtains (782) audio content for an audio content item (e.g., a podcast, audiovisual recording, or other type of audio content). In some embodiments, the computing system obtains the audio content from a media database (e.g., the media content database 332).

The computing system generates (784) sentence embeddings (e.g., using the sequence encoder 404) for the audio content. In some embodiments, generating the sentence embeddings includes generating token embeddings (e.g., the token embeddings 402) from the audio content, and using a token sequence encoder to generate the sentence embeddings from the token embeddings.

The computing system generates (786) segment embeddings (e.g., the segment embeddings 412) using the sentence embeddings and context information. In some embodiments, generating the segment embeddings includes inputting the sentence embeddings into a self-attention sequence encoder (e.g., the sentence sequence encoder 410). In some embodiments, the context information includes information about one or more of: musical cues, conversation pauses, changes in speaker, and non-verbal noises.

In some embodiments, the computing system includes a hierarchical transformer that includes a sentence encoder, a context encoder, a data masking component, and a classification layer. In some embodiments, the sentence encoder uses a pretrained sentence-BERT model (e.g., a small sentence-BERT model for computational speed).

In some embodiments, after embedding the sentences, a context encoder (e.g., with positional embeddings) generates contextualized representations for each sentence. In some embodiments, each contextualized representation is projected to a scalar value through a linear layer. During inference, the scalar values may be input to a sigmoidal activation function. This outputs a number between 0 and 1 for each sentence, which can be interpreted as a probability. In some embodiments, the classification is designated as positive if the probability is greater than a preset threshold.

In some embodiments, a data evaluation masking layer is used between the context encoder and classification layer. In some embodiments, the data masking layer is only used during training. In some embodiments, the data masking layer masks non-transition representations from being evaluated. In some embodiments, the masking is done uniformly with a given probability (e.g., based on a hyperparameter).

The computing system determines (788), for each segment embedding, whether the segment embedding includes a topic transition for the audio content item. In some embodiments, determining whether the segment embedding includes a topic transition includes inputting the segment embedding into a binary segment bound classifier (e.g., the segment classifiers 416).

In some embodiments, the computing system uses a sliding window to generate windowed sequential data points and/or samples points from audio content. In some embodiments, the computing system generates non-windowed sequential data points. In some embodiments, windowed transition data points and/or samples points around each transition with a sliding window. In some embodiments, each data point contains the transition sentence. In some embodiments, the computing system generates respective data points for each transition. In some embodiments, the computing system randomly selects a starting position. For example, for each episode transition, there may be multiple randomly-sampled starting positions The computing system generates (790) one or more topic transition timestamps for the audio content item in accordance with the determining. In some embodiments, the computing system includes the one or more topic transition timestamps in an augmented transcript. In some embodiments, the computing system provides the one or more topic transition timestamps in a user interface for audio playback.

In some embodiments, the computing system utilizes a labeled dataset for supervised learning. In some embodiments, chapter timestamps are extracted from podcast descriptions. For example, episodes with timestamps in the description are extracted via a regular expression. As an example, the regular expression requires that the description contain at least one sub-string with a "mm:ss" or "hh:mm:ss" format, where "hh" corresponds to hours, "mm" corresponds to minutes, and "ss" corresponds to seconds. In some embodiments, after the episode regex match, descriptions are split into rows. For example, chapter timestamps are extracted from rows that contain the following formats: (i) start and end timestamps before chapter title, (ii) start and end timestamps after chapter title, (iii) start timestamp before chapter title, or (iv) start timestamp after chapter title.

In some embodiments, one or more audio transcripts are organized into sentences. For example, sentences are split via punctuation characters, such as '.', '!', and '?'. A sentence may be mapped to a positive label if its start and end encompasses a chapter timestamp. Chapter timestamps may be mapped to respective sentences. A chapter timestamp may be ignored (skipped) if it falls within the same sentence as the previous chapter timestamp. In some embodiments, sentence and label extraction algorithms output, for each episode, a list with JSON elements, e.g., that contain the sentence string, a label, a start time, and/or an end time (e.g., in seconds).

Table 1 below includes example statistics for a corpus of 21,449 episodes. In the example shown in Table 1, episode level statistics are extracted to obtain an overview of the number of sentences and transitions, and sentence length. In this example, there are an average of 892 sentences per episode, with a standard deviation of 606 sentences. The sentences have an average duration of 4 seconds. In addition, in this example, there are an average of 11 transitions per episode (e.g., with a minimum of 2 transitions and maximum 121 transitions).

TABLE 1

Episode Level Statistics

| Metric | Mean | Median | Std. Deviation | Minimum | Maximum |
|---|---|---|---|---|---|
| Number of sentences | 892 | 742 | 606 | 1.0 | 6060 |
| Time (s)/ sentence | 3.98 | 3.87 | 1.08 | 0.2 | 46.0 |
| Number of transitions | 10.7 | 9.0 | 6.87 | 2.0 | 121 |

Table 2 below includes segment-level statistics for the corpus, including the number of sentences and segment times. In Table 2, a segment is defined as a collection of sentences where the first sentence has a positive label.

TABLE 2

| Segment Statistics | | | | | |
|---|---|---|---|---|---|
| Metric | Mean | Median | Std. Deviation | Minimum | Maximum |
| Sentences/segment | 85.4 | 46.0 | 126 | 1.0 | 2820 |
| Time (s)/segment | 345 | 203 | 470 | 0.0 | 12700 |

In some embodiments, the computing system identifies the audio content for the audio content item as having chapter timestamp metadata; and, after generating the one or more topic transition timestamps, compares the one or more topic transition timestamps to the chapter timestamp metadata.

In some embodiments, the computing system provides a user interface for users to search the topic transition timestamps. In some embodiments, the computing system provides a user interface for the audio content item with playback functionality and links for the topic transition timestamps.

As one of skill in the art will appreciate, aspects of the method 780 can be combined and/or replaced with aspects of the methods 700 and 750. The method 780 can include the operations of the methods 700 and 750. For example, the method 700 can include the operation 706 of the method 700.

Turning now to some example embodiments.

(A1) In one aspect, some embodiments include a method of segmenting media content (e.g., identifying chapter or topic transitions). The method is performed at a computing device (e.g., the electronic device 102 or the media content server 104) having one or more processors and memory. The method includes: (i) obtaining audio content for a podcast (e.g., from the media content database 332); (ii) generating sentence embeddings for the audio content (e.g., via the sequence encoder 404); (iii) generating segment embeddings using the sentence embeddings and context information (e.g., using the sentence sequence encoder 410); (iv) determining, for each segment embedding, whether the segment embedding includes a topic transition for the podcast (e.g., via the segment classifiers 416); and (v) generating one or more topic transition timestamps (e.g., the transition timestamps 336) for the podcast in accordance with the determining.

(A2) In some embodiments of A1, generating the sentence embeddings includes: (i) generating token embeddings (e.g., the token embeddings 402) from the audio content; and (ii) using a token sequence encoder to generate the sentence embeddings from the token embeddings (e.g., via embedding module 326). In some embodiments, the sentence embeddings are generated based on audio information (e.g., detection of pauses or breathes by the speaker in the audio data).

(A3) In some embodiments of A1 or A2, generating the segment embeddings comprises inputting the sentence embeddings into a self-attention sequence encoder (e.g., the sentence sequence encoder 410).

(A4) In some embodiments of any of A1-A3, the method further includes: (i) prior to obtaining the audio content: (a) searching a media database for podcasts that include chapter timestamp metadata; and (b) identifying the audio content for the podcast as having chapter timestamp metadata; and (ii) after generating the one or more topic transition timestamps, comparing the one or more topic transition timestamps to the chapter timestamp metadata (e.g., performing supervised training using the chapter timestamp data).

(A5) In some embodiments of any of A1-A4, the context information includes information about one or more of: musical cues, conversation pauses, changes in speaker, and non-verbal noises. In some embodiments, the context information includes information about advertising periods in the podcast. In some embodiments, the context information includes an indication of time elapsed between sentences. In some embodiments, the context information includes an indication of audio properties during the elapsed time (e.g., silence, music, noise, alarm, or other non-verbal sounds).

In some embodiments, audio features are treated as transcript markup, augmenting the transcripts with predicted audio events (such as music, silence, and/or noises). In some embodiments, a classifier (e.g., a Yamnet classifier) is used to classify gaps between sentences in the transcript. In some embodiments, audio event duration and the duration of the time gap between sentences is included in the sentence embeddings. In some embodiments, speaker change information (e.g., generated via a component such as Pyannote) is used to add features indicating which speaker is uttering each sentence.

In some embodiments, during training, for each sentence, binary labels are attached from human annotated data indicating if the sentence is the start of a new chapter. In some embodiments, during training, a machine learning model is given a penalty or reward based on whether the segment cut points identified by the system match labels in the training data. In some embodiments, the machine learning model is given a penalty or reward based on user feedback regarding the segment cut points identified by the system.

In some embodiments, the augmented transcript is embedded sentence by sentence using a transformer encoder on the token level (e.g., XLM). In some embodiments, the sentence embeddings are passed to another encoder that embeds the sentence embeddings in their document context and performs one or more layers of self-attention to generate contextualized encodings of each augmented sentence. In some embodiments, the contextualized sentence embeddings are passed to a sigmoid classifier that predicts whether each sentence is the start of a new chapter.

In some embodiments, the audio data is encoded into vector representations over brief audio frames (e.g., using either raw MFCC features, HuBERT, and/or VATT). In some embodiments, a token-level transformer encoder is used to generate sentence embeddings of the words/terms. In some embodiments, the token-level transformer encoder is used for either fixed-length windows in the audio, or for each sentence span plus a distance before the next sentence. In some embodiments, the embeddings of the words in the transcript are concatenated with the raw audio features over the span. In some embodiments, the concatenated audio and text vectors are input to the contextual sentence-level neural network (described above) with multiple layers of self-attention and a sigmoid classification step.

In some embodiments, the aligned text and audio are separately encoded with sentence embeddings of the text from a token-level encoder and the audio into vector representations over brief audio frames (e.g., using the raw MFCC features or HuBERT/VATT features). In some embodiments, separate transformer encoders and self-attention layers are used for the two modalities. In some embodiments, the audio and text modalities are combined at the classification step, and the training classification loss is propagated back through each modality's encoder parameters.

In some embodiments, only audio data is used for the media segmentation. In some situations, a fast model is required, and the transcription step is skipped to increase speed of the model. In some situations, the text transcription quality is poor or doesn't exist. In some embodiments, the audio is encoded into vector representations over brief audio frames (e.g., using the raw MFCC features or HuBERT features). In some embodiments, the MFCC or HuBERT features are used as-is. In some embodiments, the vector values are aggregated over longer timespan windows. In some embodiments, for each fixed-length window in the audio, labels are attached denoting whether the chapter transition occurs in the time window.

(A6) In some embodiments of any of A1-A5, determining whether the segment embedding includes a topic transition comprises inputting the segment embedding into a binary segment bound classifier (e.g., the segment classifiers 416).

(A7) In some embodiments of any of A1-A6, the method further includes providing a user interface for users to search the topic transition timestamps. For example, the user is provided with a search interface for searching for podcast segments on specific topics within the media content database 332.

(A8) In some embodiments of any of A1-A7, the method further includes providing a user interface for the podcast with playback functionality and links for the topic transition timestamps.

(A9) In some embodiments of any of A1-A8, the method further includes providing a list of recommended segments to a user (e.g., a playlist). For example, the list of recommended segments are provided via the recommender module 320 and/or playlist module 318. In some embodiments, the list of recommended segments are provided for a particular topic (e.g., in response to a user search relating to the particular topic).

(B1) In another aspect, some embodiments include a method of segmenting media content (e.g., identifying chapter or topic transitions). The method is performed at a computing device (e.g., the electronic device 102 or the media content server 104) having one or more processors and memory. The method includes: (i) obtaining audio content for a spoken word media item, such as a podcast or talk show (e.g., from the media content database 332); (ii) identifying a highlight in the audio content (e.g., via the heuristic engine 510) using one or more positive signals (e.g., from the sentiment analysis component 504) and one or more negative signals (e.g., from the music detection component 506 and the advertisement detection component 508); (iii) identifying a local similarity minimum in the audio content using adjacent sentence similarity information (e.g., via the segmentation process illustrated in FIG. 6); (iv) defining a media segment having a start time based on the highlight and an end time based on the local similarity minimum; and (v) providing the media segment to a user (e.g., via the recommender module 320 or playlist module 318).

(B2) In some embodiments of B1, identifying the highlight is based on topic modeling on the audio content (e.g., using the topic modeling component 502).

(B3) In some embodiments of B1 or B2, the positive signals include sentiment analysis and topic modeling. In some embodiments, the sentiment analysis is performed via an ALBERT model. In some embodiments, the topic modeling is performed via LDA.

(B4) In some embodiments of any of B1-B3, the negative signals include music detection and/or advertising detection (e.g., outputs of the music detection component 506 and/or the advertisement detection component 508).

(B5) In some embodiments of any of B1-B4, the audio content comprises a text transcript generated from audio of the spoken word media content (e.g., generated using automatic speech recognition).

(B6) In some embodiments of any of B1-B5, the local similarity minimum comprises a local similarity minimum in cosine similarity (e.g., as described previously with respect to FIG. 6).

(B7) In some embodiments of any of B1-B6, the method further comprises generating sentence embeddings for the audio content using one or more transformers, where the local similarity information is generated from the sentence embeddings and one or more additional features. In some embodiments, the one or more transformers comprise a BERT-based model (e.g., a BERT or ALBERT model).

(B8) In some embodiments of B7, the one or more additional features include user behavior data and audio analysis data. In some embodiments, the additional features include one or more of: speaker identification, speaking volume (e.g., whispering vs. shouting), background and non-verbal noises, and musical cues.

(B9) In some embodiments of any of B1-B8, the adjacent sentence similarity information includes one or more of ranking and clustering windows of sentences.

(B10) In some embodiments of any of B1-B9, identifying the local similarity minimum includes selecting a minimum similarity score based on at least one of: cut scores, segment length requirements, relative scores, and one or more additional factors. For example, the additional factors may include logic to satisfy the requirements of a feature for constraining minimum and/or maximum segment length, a segment topic coherence, and/or the total number of segments (e.g., while accounting for naturally occurring semantic breaks and/or topic changes).

(B11) In some embodiments of any of B1-B10, the method further comprises generating a segment sequence (e.g., a playlist or segment feed) comprising the media segment and one or more additional segments determined to have a similar topic. In some embodiments, the segment sequence includes a plurality of segments from one or more spoken word media content items. In some embodiments, the plurality of segments are arranged in the sequence based on similarity, mood, continuity and/or entailment scores/requirements. In some embodiments, the segment sequence is provided and/or recommended to user(s) (e.g., based on user interests, searches, and/or requests).

In another aspect, some embodiments include a computing system including one or more processors and memory coupled to the one or more processors, the memory storing one or more programs configured to be executed by the one or more processors, the one or more programs including instructions for performing any of the methods described herein (e.g., A1-A9 and B1-B11 above).

In yet another aspect, some embodiments include a non-transitory computer-readable storage medium storing one or more programs for execution by one or more processors of a computing system, the one or more programs including instructions for performing any of the methods described herein (e.g., A1-A9 and B1-B11 above).

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method of segmenting media content, the method comprising:
- at a computing device having one or more processors and memory:
- obtaining audio content for an audio content item;
- generating sentence embeddings for the audio content using a first sequence encoder;
- combining the sentence embeddings with context information, wherein the context information includes information about one or more of the group consisting of: musical cues, conversational pauses, changes in speaker, and non-verbal noises;
- generating segment embeddings by inputting the combined sentence embeddings and context information into a second sequence encoder distinct from the first sequence encoder;
- determining, by passing each respective segment embedding to a segment classifier, whether the respective segment embedding includes a topic transition for the audio content item; and
- generating one or more topic transition timestamps for the audio content item in accordance with the determining.

2. The method of claim 1, wherein the first sequence encoder is a token sequence encoder, and generating the sentence embeddings comprises:
- generating token embeddings from the audio content; and
- using the token sequence encoder to generate the sentence embeddings from the token embeddings.

3. The method of claim 1, wherein the second sequence encoder is a self-attention sequence encoder.

4. The method of claim 1, further comprising:
- identifying the audio content for the audio content item as having chapter timestamp metadata; and
- after generating the one or more topic transition timestamps, comparing the one or more topic transition timestamps to the chapter timestamp metadata.

5. The method of claim 1, wherein determining whether the respective segment embedding includes a topic transition comprises inputting the respective segment embedding into a binary segment bound classifier.

6. The method of claim 1, further comprising providing a user interface for users to search the topic transition timestamps.

7. The method of claim 1, further comprising providing a user interface for the audio content item with playback functionality and links for the topic transition timestamps.

8. The method of claim 1, wherein generating the one or more topic transition timestamps comprises defining a media segment having a start time based on an identified highlight in the audio content.

9. A computing device, comprising:
- one or more processors;
- memory; and
- one or more programs stored in the memory and configured for execution by the one or more processors, the one or more programs comprising instructions for:
  - obtaining audio content for an audio content item;
  - generating sentence embeddings for the audio content using a first sequence encoder;
  - combining the sentence embeddings with context information, wherein the context information includes information about one or more of the group consisting of: musical cues, conversational pauses, changes in speaker, and non-verbal noises;
  - generating segment embeddings by inputting the combined sentence embeddings and context information into a second sequence encoder distinct from the first sequence encoder;
  - determining, by passing each respective segment embedding to a segment classifier, whether the respective segment embedding includes a topic transition for the audio content item; and
  - generating one or more topic transition timestamps for the audio content item in accordance with the determining.

10. The computing device of claim 9, wherein the first sequence encoder is a token sequence encoder, and generating the sentence embeddings comprises:
- generating token embeddings from the audio content; and
- using the token sequence encoder to generate the sentence embeddings from the token embeddings.

11. The computing device of claim 9, wherein the second sequence encoder is a self-attention sequence encoder.

12. The computing device of claim 9, wherein the one or more programs further comprise instructions for:
- identifying the audio content for the audio content item as having chapter timestamp metadata; and after generating the one or more topic transition timestamps, comparing the one or more topic transition timestamps to the chapter timestamp metadata.

13. The computing device of claim 9, wherein determining whether the respective segment embedding includes a topic transition comprises inputting the respective segment embedding into a binary segment bound classifier.

14. The computing device of claim 9, wherein the one or more programs further comprise instructions for providing a user interface for users to search the topic transition timestamps.

15. The computing device of claim 9, wherein the one or more programs further comprise instructions for providing a user interface for the audio content item with playback functionality and links for the topic transition timestamps.

16. The computing device of claim 9, wherein generating the one or more topic transition timestamps comprises defining a media segment having a start time based on an identified highlight in the audio content.

17. A non-transitory computer-readable storage medium storing one or more programs configured for execution by a computing device having one or more processors and memory, the one or more programs comprising instructions for:

obtaining audio content for an audio content item;

generating sentence embeddings for the audio content using a first sequence encoder;

combining the sentence embeddings with context information, wherein the context information includes information about one or more of the group consisting of: musical cues, conversational pauses, changes in speaker, and non-verbal noises;

generating segment embeddings by inputting the combined sentence embeddings and context information into a second sequence encoder distinct from the first sequence encoder;

determining, by passing each respective segment embedding to a segment classifier, whether the respective segment embedding includes a topic transition for the audio content item; and generating one or more topic transition timestamps for the audio content item in accordance with the determining.

18. The non-transitory computer-readable storage medium of claim 17, wherein the first sequence encoder is a token sequence encoder, and generating the sentence embeddings comprises:

generating token embeddings from the audio content; and using the token sequence encoder to generate the sentence embeddings from the token embeddings.

19. The non-transitory computer-readable storage medium of claim 17, wherein the second sequence encoder is a self-attention sequence encoder.

20. The non-transitory computer-readable storage medium of claim 17, wherein the one or more programs further comprise instructions for:

identifying the audio content for the audio content item as having chapter timestamp metadata; and after generating the one or more topic transition timestamps, comparing the one or more topic transition timestamps to the chapter timestamp metadata.

* * * * *